United States Patent
Hayashi

(10) Patent No.: US 12,112,862 B2
(45) Date of Patent: Oct. 8, 2024

(54) METHOD FOR MANUFACTURING SPIRAL TUBE

(71) Applicant: YAZAKI CORPORATION, Tokyo (JP)

(72) Inventor: Michio Hayashi, Toyota (JP)

(73) Assignee: YAZAKI CORPORATION, Tokyo (JP)

(*) Notice: Subject to any disclaimer, the term of this patent is extended or adjusted under 35 U.S.C. 154(b) by 853 days.

(21) Appl. No.: 17/178,172

(22) Filed: Feb. 17, 2021

(65) Prior Publication Data

US 2021/0257129 A1 Aug. 19, 2021

(30) Foreign Application Priority Data

Feb. 19, 2020 (JP) ................. 2020-026060

(51) Int. Cl.
*B29C 48/09* (2019.01)
*B29C 48/00* (2019.01)
*H01B 13/012* (2006.01)

(52) U.S. Cl.
CPC ..... *H01B 13/01281* (2013.01); *B29C 48/001* (2019.02); *B29C 48/09* (2019.02)

(58) Field of Classification Search
CPC . B29C 48/09; B29C 48/001; H01B 13/01281; H02G 3/04; F16L 11/16
See application file for complete search history.

(56) References Cited

U.S. PATENT DOCUMENTS 5,802,814 A 9/1998 Sano
2019/0277447 A1* 9/2019 Rocher ............... B29C 48/0015

FOREIGN PATENT DOCUMENTS

| JP | 06088129 | * 12/1994 |
| JP | H06-88129 U | 12/1994 |
| JP | 2000-244145 A | 9/2000 |
| JP | 2001-236839 A | 8/2001 |
| JP | 2003-65471 A | 3/2003 |
| JP | 2009-117171 A | 5/2009 |
| JP | 2010-255671 A | 11/2010 |
| JP | 2010255671 | * 11/2010 |
| JP | 2016-63584 A | 4/2016 |
| JP | 2016063584 | * 4/2016 |

* cited by examiner

*Primary Examiner* — Alison L Hindenlang
*Assistant Examiner* — Debjani Roy
(74) *Attorney, Agent, or Firm* — KENEALY VAIDYA LLP

(57) ABSTRACT

A method for manufacturing a spiral tube which is made of a resin material and spirally covers a periphery of a wire harness along an extending direction of the wire harness, the method includes extrusion molding a tube material which is made of the resin material, heating and softening the tube material and forming the spiral tube, and spirally wounding the spiral tube around the wire harness and cutting the spiral tube.

6 Claims, 8 Drawing Sheets

METHOD FOR MANUFACTURING SPIRAL TUBE

CROSS REFERENCE TO RELATED APPLICATIONS

This application claims priority from Japanese Patent Application No. 2020-026060 filed on Feb. 19, 2020, the entire contents of which are incorporated herein by reference.

BACKGROUND OF THE INVENTION

Field of the Invention

The present invention relates to a method for manufacturing a spiral tube which is used by being mounted on a wire harness.

Description of Related Art

For example, a wire harness (hereinafter referred to as a harness) used in a vehicle or the like is often used in a state where a plurality of harnesses are bundled. In such a case, a protective material which covers the bundled harness so as to protect the bundled harness is used. As such a protective material, for example, a spiral tube described in Patent Literature 1 is used.

FIGS. 10A to 10C are simplified views showing a form of the spiral tube after the spiral tube is manufactured and before the spiral tube is mounted. In order to obtain a spiral tube 100, first, as shown in FIG. 10A, a cylindrical tube 100A, which has an inner diameter larger than that of a plurality of bundled harnesses to be mounted, is formed by molding a soft resin material. Such a cylindrical tube 100A can be manufactured particularly easily by extrusion molding.

Thereafter, as shown in FIG. 10B, a spiral cutout portion (slit) S is formed in a cylindrical outer surface of the tube 100A by machining over a length direction, such that the spiral tube 100 is obtained.

After the spiral tube 100 is manufactured in a state as shown in FIG. 10B, the spiral tube 100 is cut to a required length, and then can be easily wound around the plurality of bundled harnesses (harness bundle HA) as shown in FIG. 10C. An operation of FIG. 10C can be easily performed by using an instrument as disclosed in Patent Literature 1 or by manual work of an operator.

Such a spiral tube 100 is inexpensive since the spiral tube 100 is easily manufactured in this way. Further, the spiral tube 100 is widely used since the harness bundle HA is easily bent in a state where the spiral tube 100 is mounted.

Depending on a product or a part to be used, a length of the spiral tube described above is determined to be fixed when the spiral tube is used. Therefore, a plurality of the spiral tubes in the state of FIG. 10B are manufactured and managed for each length determined for each of a plurality of types. On the other hand, in order to simplify processes, a process of forming the cutout portion S (FIG. 10B) is performed in a state where the spiral tube is long before cutting. Therefore, in the manufacturing method described above, after the long tube 100A shown in FIG. 10A is once manufactured, it is necessary to form the cutout portion S over an entire region in the length direction of the long tube 100A as shown in FIG. 10B. Thereafter, the long spiral tube 100 is cut to predetermined lengths and managed for each length, and then an operation of mounting the spiral tube 100 to the harness bundle HA is performed as shown in FIG. 10C.

[Patent Literature 1] JP-A-2001-236839

In the above process, an operation of handling the tube 100A or the spiral tube 100 in the long state is required, and such an operation is not always easy. Moreover, although an operation of mounting the tube 100A or the spiral tube 100 after cutting is easier than other protective materials, labor is required.

Therefore, there is a demand for a method for manufacturing a spiral tube that can be easily manufactured and mounted.

SUMMARY

One or more embodiments provide a method for manufacturing a spiral tube that can be easily manufactured and mounted.

In accordance with one or more embodiments, a method for manufacturing a spiral tube which is made of a resin material and spirally covers a periphery of a wire harness along an extending direction of the wire harness, the method includes extrusion molding a tube material which is made of the resin material, heating and softening the tube material and forming the spiral tube, and spirally wounding the spiral tube around the wire harness and cutting the spiral tube.

The method for manufacturing the spiral tube may further include winding the tube material around a reel after extrusion molding the tube material, and unwinding the tube material from the reel in heating and softening the tube material.

In the spirally wounding the spiral tube around the wire harness, the tube material may be spirally wound around the wire harness in such a manner that a gap is formed between adjacent tube materials on a surface of the wire harness.

The spirally wounding the spiral tube around the wire harness may include winding the tube material around the surface of the wire harness and forming a lower layer spiral tube, and winding the tube material around the wire harness and forming an upper layer spiral tube in such a manner that the gap is covered, after the forming the lower layer spiral tube.

In the spirally wounding the spiral tube around the wire harness, the tube material may be spirally wound around the wire harness in such a manner that adjacent tube materials partially overlap each other on the surface of the wire harness in a radial direction of the wire harness.

The tube material may include a first engaging portion on a first side edge part and a second engaging portion on a second side edge part, along the longitudinal direction of the tube material. In the spirally wounding the spiral tube around the wire harness, the first engaging portion and the second engaging portion of the adjacent tube materials may be configured to be engaged with each other on the surface of the wire harness so as to prevent an increase in a distance between the adjacent tube materials.

The tube material may include a curved surface portion having a curved surface shape between the first side edge part and the second side edge part.

DETAILED DESCRIPTION

A method for manufacturing a spiral tube according to an embodiment of the present invention also includes a process until a spiral tube is mounted on a harness (harness bundle) as will be described below, and manufacturing of the spiral tube is also completed simultaneously with completion of the mounting. Therefore, a process from the manufacturing to the mounting of the spiral tube becomes simple. Such a manufacturing method includes an extrusion molding process of manufacturing a tube material, and a mounting process of spirally winding the tube material around a harness and then cutting the tube material.

Figure 1:
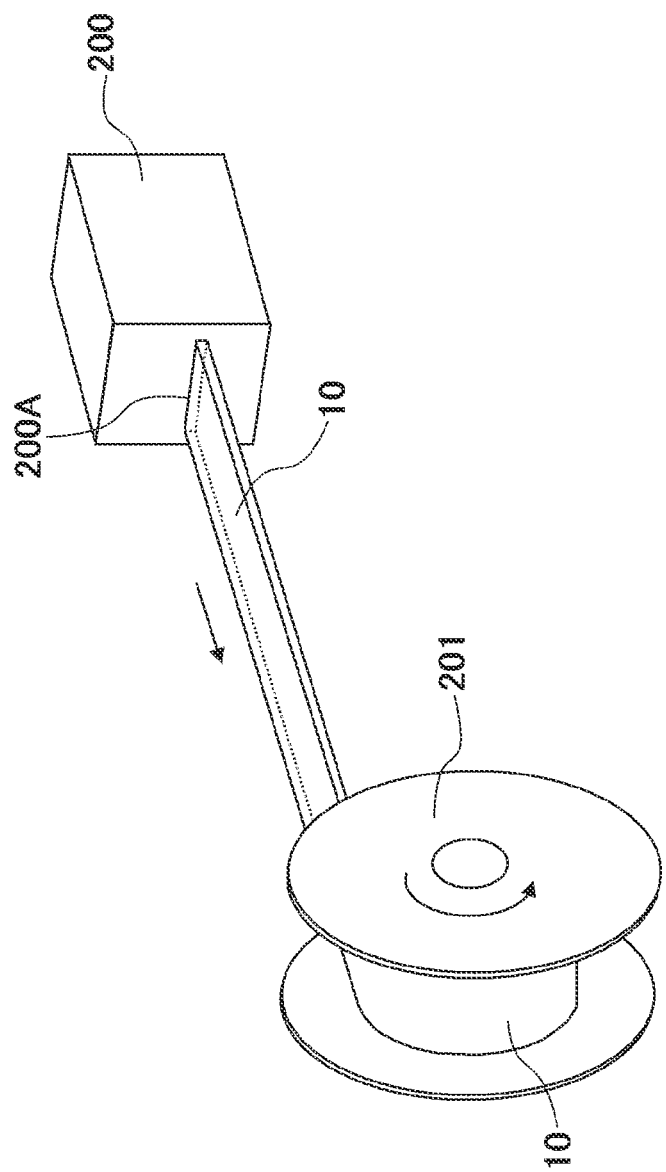
FIG. 1 shows an extrusion molding process in a method for manufacturing a spiral tube according to an embodiment.

FIG. 1 schematically shows the extrusion molding process. Such a process corresponds to a process of manufacturing a tube 100A shown in FIG. 10A in a manufacturing method in related art. Here, a heated and melted resin material is pressurized by an extrusion molding machine 200, and is extruded from an opening portion 200A to be cooled, so that a tube material 10 which serves as an original form of the spiral tube is manufactured. Since a cross-sectional shape, which is perpendicular to a longitudinal direction of the tube material 10 is the same as a shape of the opening portion 200A and is formed continuously, the tube material 10 can be wound and accommodated around a reel 201 in a long state.

Here, a cross-sectional shape along an injection direction (longitudinal direction) of the tube material 10 is the same as the shape of the opening portion 200A. Here, as a simplest example, such a shape is assumed to be a simple rectangular shape as shown in FIG. 1. Therefore, the tube material 10 has a tape shape.

Figure 2A:
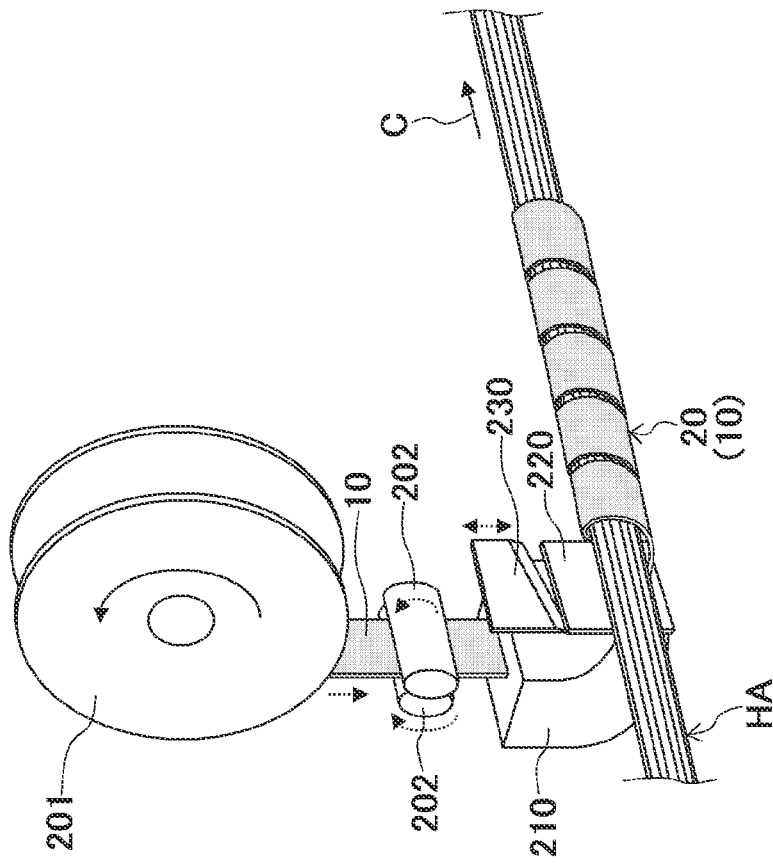
FIGS. 2A and 2B show a mounting process in the method for manufacturing a spiral tube according to the embodiment.
Figure 2B:
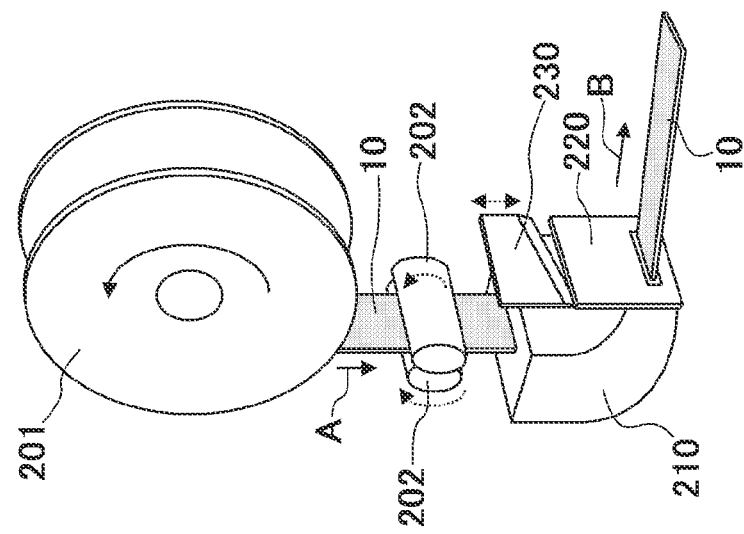

FIGS. 2A and 2B schematically show the mounting process. As shown in FIG. 2A, the tube material 10 is unwound and drawn from the reel 201, where the tube material 10 is wound, by a member feeding roller 202 as indicated by arrow A. The drawn tube material 10 is heated to a temperature equal to or higher than a softening temperature thereof by a shape changing portion 210 and is then taken out as indicated by arrow B.

Thereafter, the tube material 10 drawn from the shape changing portion 210 is wound around a harness bundle HA as shown in FIG. 2B. At this time, the shape changing portion 210 is formed in an arc shape as shown in the drawing. Therefore, the tube material 10 drawn from the shape changing portion 210 has a curved shape so as to be wound around the harness bundle HA. When the harness bundle HA is moved as indicated by arrow C, the tube material 10 is cooled after being wound, and is thereby cured to form a spiral tube 20. At this time, a flat plate-shaped protective cover 220 extending in a vertical direction is provided between the harness bundle HA and the shape changing portion 210. A cutting blade 230 moves up and down along a surface of the protective cover 220 on the side of the harness bundle HA. A length of the spiral tube 20 can be set by cutting the tube material 10 when the cutting blade 230 moves from an upper side to a lower side. The harness bundle HA may also be moved as indicated by arrow C and rotated in such a manner that the tube material 10 is wound around the harness bundle HA in a shown direction.

In this manufacturing method, as shown in FIG. 2B, the spiral tube 20 is cut to a predetermined length after being mounted on the harness bundle HA. Therefore, it is not necessary to mount the spiral tube on the harness bundle HA by an operator or another device. Moreover, since the tube material 10 is wound around the harness bundle HA in the state of being heated and softened by the shape changing portion 210, the spiral tube 20 can be reliably and easily mounted.

Figure 10A:
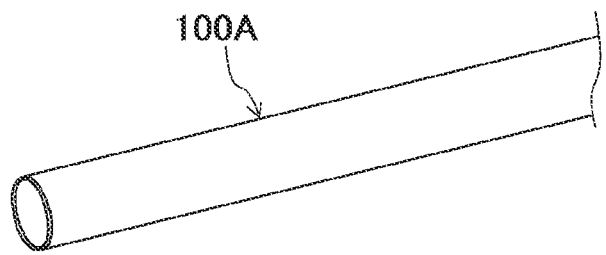
FIGS. 10A to 10C show a form at the time of manufacturing and mounting of a spiral tube in related art.
Figure 10B:
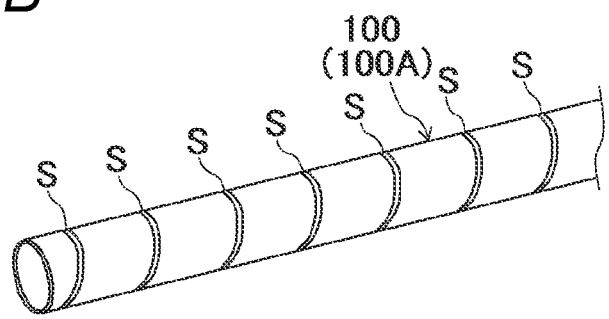

Since the tube material 10 is stored in the state of being wound around the reel 201 after the extrusion molding process and is cut to a desired length in the mounting process (FIG. 2B) so as to be used, it is not necessary to manage the spiral tube after cutting for each length as shown in FIG. 10B.

Figure 3A:
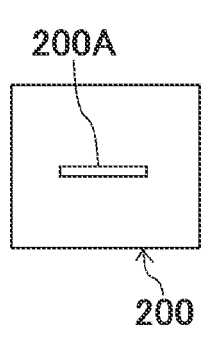
FIG. 3A is a shape of an opening portion of an extrusion molding machine.
Figure 3B:
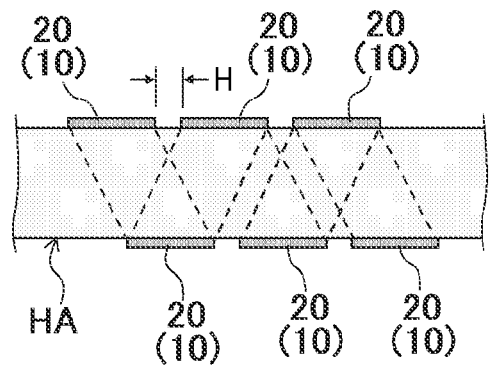
FIG. 3B is a cross-sectional view of a harness bundle in a state where a spiral tube is mounted in the method for manufacturing a spiral tube according to the embodiment.

FIG. 3A shows the shape of the opening portion 200A of the extrusion molding machine 200 shown in FIG. 1. Here, the opening portion 200A has a rectangular shape that is thin in the vertical direction. Therefore, the tube material 10 obtained in this manner has the tape shape, and is easy to be wound around the reel 201. It is also easy to wind the tube material 10 spirally around the harness bundle HA after passing through the shape changing portion 210, as shown in FIG. 2B. FIG. 3B schematically shows a cross section along a central axis of the harness bundle HA in this case. The shape of each tube material 10 shown in FIG. 3B corresponds to the shape of the opening portion 200A shown in FIG. 3A. Here, an interval between adjacent tube materials 10 of the spiral tube 20 after the mounting is H (H>0). H corresponds to a width of the cutout portion S shown in FIG. 10B.

Figure 10C:
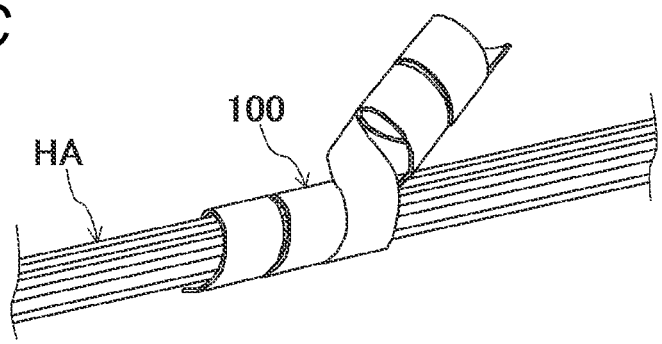

A form of the spiral tube 20 is the same as that of the spiral tube 100 in the related art in a state where the spiral tube 20 is mounted on the harness bundle HA as shown in FIG. 3B. However, according to the above-described manufacturing method, various forms, which are difficult to be achieved by the manufacturing method in the related art as shown in FIGS. 10A to 10C, can be easily achieved for the spiral tube. Hereinafter, such modifications will be described.

According to the manufacturing method in the related art shown in FIGS. 10A to 10C, the shape of the spiral tube 100 does not change before mounting (FIG. 10B) and after mounting. In contrast, according to the manufacturing method of the present invention, the shape of the spiral tube after mounting can be set by the extrusion molding process or the mounting process.

First Modification

In a first modification, a shape of the tube material 10 (extrusion molding process) is the same as that in the case of FIG. 3A, and the shape of the spiral tube after mounting is different from that of the spiral tube 20 of FIG. 3B by changing conditions of the mounting process. A shape of a spiral tube 21 is shown in FIG. 4 in correspondence with FIG. 3B.

The spiral tube 21 is set in such a manner that the tube materials 10 adjacent to each other on a surface of the harness bundle HA partially overlap with each other, and corresponds to a case where H<0 in FIG. 3B. Such a spiral tube 21 can be obtained by setting a moving speed along arrow C in the mounting process (FIG. 2B) to be smaller than that in the case of FIG. 3B.

Figure 4:
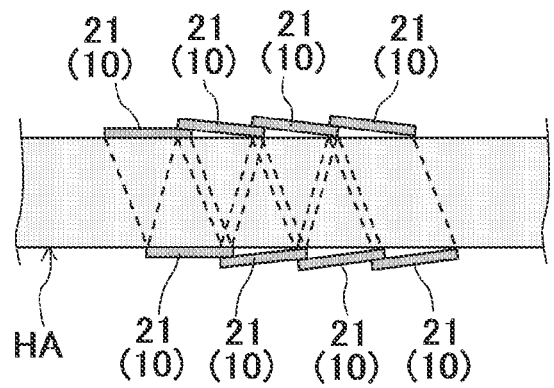
FIG. 4 is a cross-sectional view of a harness bundle in a state where a spiral tube according to a first modification is mounted.

When the spiral tube 21 shown in FIG. 3B is used, the surface of the harness bundle HA is exposed in a region of the interval H between the adjacent tube materials 10, whereas the surface of the harness bundle HA is not exposed within a range where the spiral tube 21 is mounted in a case where the spiral tube 21 shown in FIG. 4 is used. Therefore, the harness bundle HA can be more reliably protected as compared with the spiral tube 20 described above. In the manufacturing method shown in FIGS. 10A to 10C, since the shape of the spiral tube 100 before mounting and the shape of the spiral tube 100 after mounting are the same, it is obvious that it is extremely difficult to manufacture the spiral tube 21 which has such a shape.

Second Modification

Figure 5:
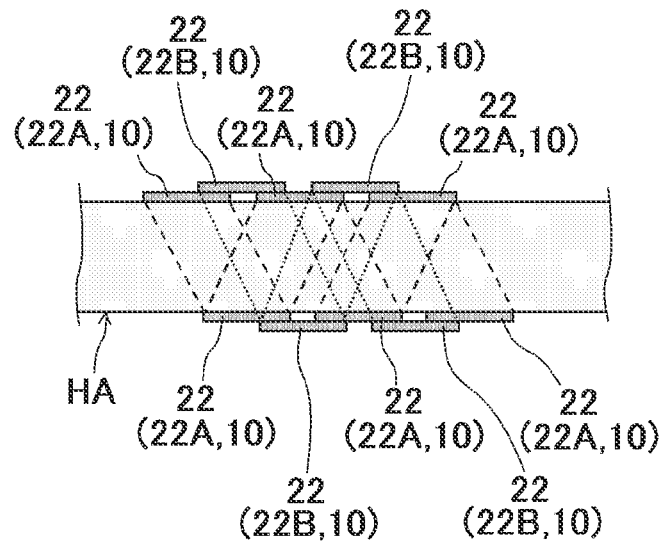
FIG. 5 is a cross-sectional view of the harness bundle in a state where a spiral tube according to a second modification is mounted.

In a second modification, the shape of the tube material 10 (extrusion molding process) is the same as that in the case of FIG. 3A, while contents of the mounting process are different from that in the case of FIG. 3B. A shape of a spiral tube 22 is shown in FIG. 5 in correspondence with FIG. 3B. Here, the spiral tube 22 has a two-layer structure including a lower layer spiral tube 22A and an upper layer spiral tube 22B. The lower layer spiral tube 22A and the upper layer spiral tube 22B use the same tube material 10, have the same form as the spiral tube 20 of FIG. 3B, and are manufactured in the same manner. Here, the tube material 10 constituting the upper layer spiral tube 22B is wound so as to be positioned above a gap between the tube materials 10 constituting the lower layer spiral tube 22A.

In this case, first, the lower layer spiral tube 22A is manufactured by the same mounting process (first mounting process) as in the case of manufacturing the spiral tube 20. Thereafter, a mounting process (second mounting process) for manufacturing the upper layer spiral tube 22B is performed after a position of the harness bundle HA where the lower layer spiral tube 22A is mounted is adjusted to achieve a structure of FIG. 5.

When the spiral tube 22 is used, the surface of the harness bundle HA is still prevented from being exposed within a range where the spiral tube 22 is mounted, and thus the harness bundle HA can be more reliably protected in the same manner as the spiral tube 21. Moreover, similarly to the spiral tube 21, it is difficult to manufacture the spiral tube 22 by the manufacturing method in the related art, whereas the spiral tube 22 can be easily manufactured according to the above-described manufacturing method.

Third Modification

Figure 6A:
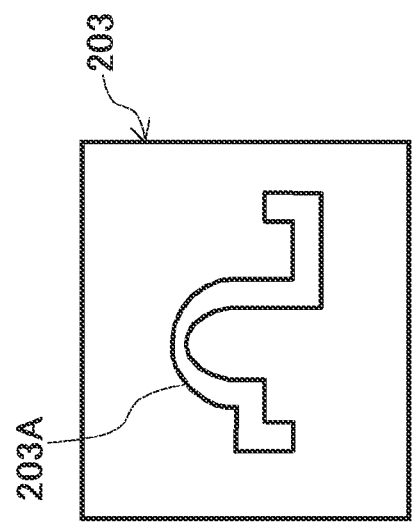
FIG. 6A is a shape of an opening portion of an extrusion molding machine used for manufacturing a spiral tube according to a third modification.
Figure 6B:
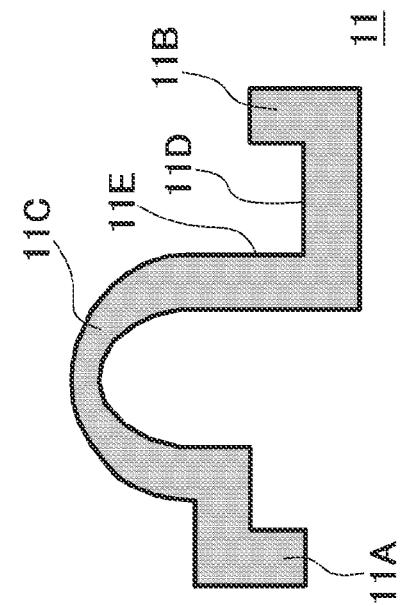
FIG. 6B is a cross-sectional shape of a tube material according to the third modification.

In a third modification, since a tube material having a shape different from that of the tube material 10, which has the simple flat plate shape, is used, the shape of the opening portion of the extrusion molding machine in the extrusion molding process is different. FIG. 6A shows an opening portion 203A of an extrusion molding machine 203 used here. FIG. 6B shows in detail a cross-sectional shape of a tube material 11 obtained thereby, and such a shape is the same as a shape of the opening portion 203A. In FIG. 6B, a first engaging portion (engaging portion) 11A which locally protrudes downward is formed on a left end portion, while a second engaging portion (engaging portion) 11B which locally protrudes upward is formed on a right end portion. A curved surface portion (deformation portion) 11C having a curved surface shape whose upper side has a convex shape is formed between the first engaging portion 11A and the second engaging portion 11B. Since the curved surface portion 11C has such a curved surface shape, the curved surface portion 11C can expand and contract in a left-right direction in the drawing. A flat first engaging portion support surface 11D is formed on an upper side between the second engaging portion 11B located on a right side and the curved surface portion 11C. Since the curved surface portion 11C has the convex shape on the upper side, a first engaging portion locking surface 11E, which is substantially perpendicular to the first engaging portion support surface 11D, is formed on a left side of the first engaging portion support surface 11D.

Figure 7:
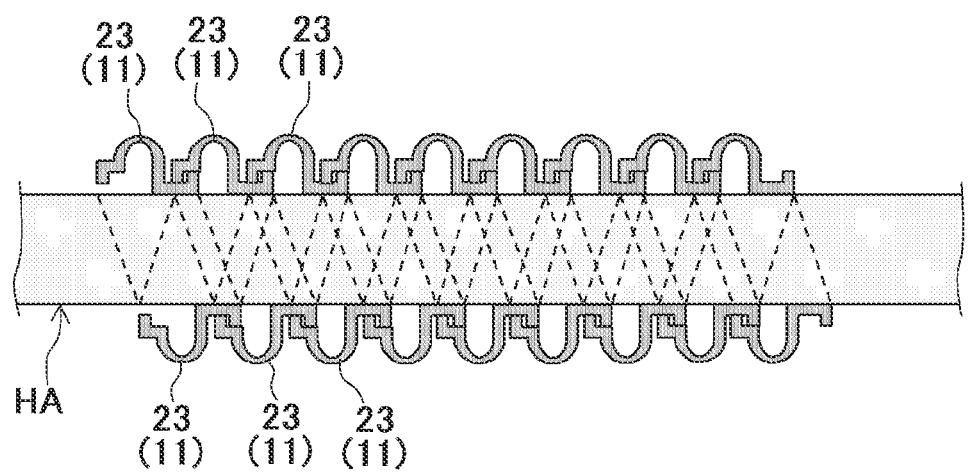
FIG. 7 is a cross-sectional view of a harness bundle in a first state where the spiral tube according to the third modification is mounted.

A spiral tube 23 shown in FIG. 7 is manufactured through using the tube material 11 by performing the mounting process in such a manner that the adjacent tube materials 11 partially overlap each other on the surface of the harness bundle HA, as in the case of manufacturing the spiral tube 21 shown in FIG. 4. Since the adjacent tube materials 11 of the spiral tube 23 partially overlap with each other, among the two tube materials 11 adjacent to each other in the left-right direction in FIG. 7, the first engaging portion 11A of the right tube material 11 is located on a left side of the second engaging portion 11B of the left tube material 11.

Figure 8A:
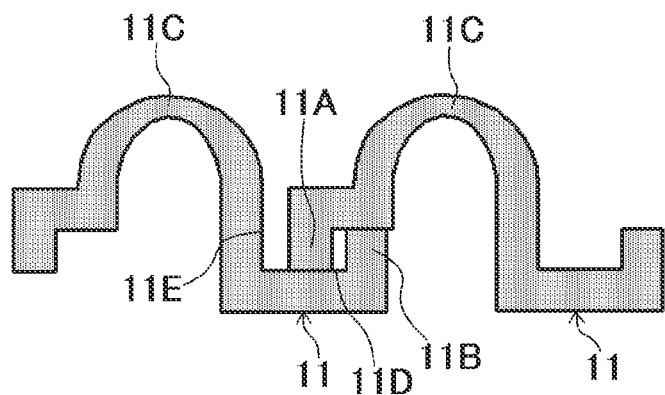
FIGS. 8A to 8C are a cross-sectional view showing three states of two tube materials adjacent to each other in the third modification.
Figure 8B:
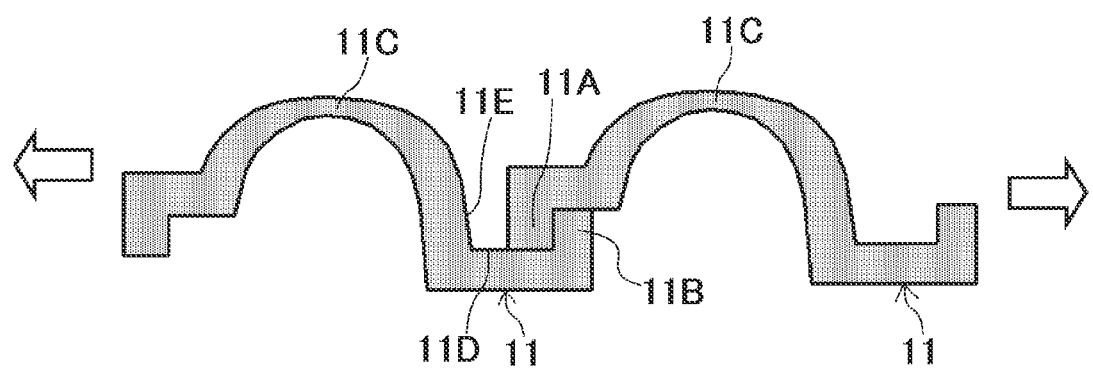
Figure 8C:
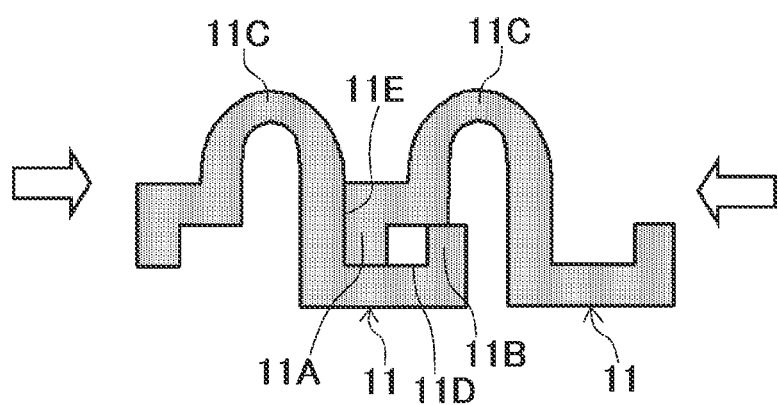

FIGS. 8A to 8C show a state of a shape change according to forces acting on the two adjacent tube materials 11 in a horizontal direction when the two adjacent tube materials 11 partially overlap each other in this way. Here, FIG. 8A shows a situation where no force is applied, FIG. 8B shows a situation where forces are applied in directions separating the two tube materials 11 from each other, and FIG. 8C shows a situation where forces are applied in directions bringing the two tube materials 11 close to each other. In FIG. 8A, the first engaging portion 11A of the right tube material 11 is located between the second engaging portion 11B and the first engaging portion locking surface L1E of the left tube material 11.

In the state of FIG. 8B where the forces in the directions of separating the two tube materials 11 are applied in such a state, since the first engaging portion 11A of the right tube material 11 is engaged with the second engaging portion 11B of the left tube material 11 from the left side, the forces of extending each of the two tube materials 11 in the left-right direction act on the two tube materials 11. As a result, each of the easily deformable curved surface portions 11C is deformed so as to be stretched in the left-right direction from the state of FIG. 8A.

On the other hand, in the state of FIG. 8C where the forces in the directions of bringing the two tube materials 11 close to each other are applied, the first engaging portion 11A of the right tube material 11 is locked from the right side by the first engaging portion locking surface 11E of the left tube material 11. As a result, the forces that compress each of the two tube materials 11 in the left-right direction act on the two tube materials 11, and each of the curved surface portions 11C which are easily deformed is compressed in the left-right direction from the state of FIG. 8A and deformed.

Therefore, in any state of FIGS. 8A to 8C, the tube material 11 moves and deforms in the horizontal direction according to the situations, and a form where the adjacent tube materials 11 partially overlap each other in the horizontal direction and are engaged with each other is maintained.

Figure 9:
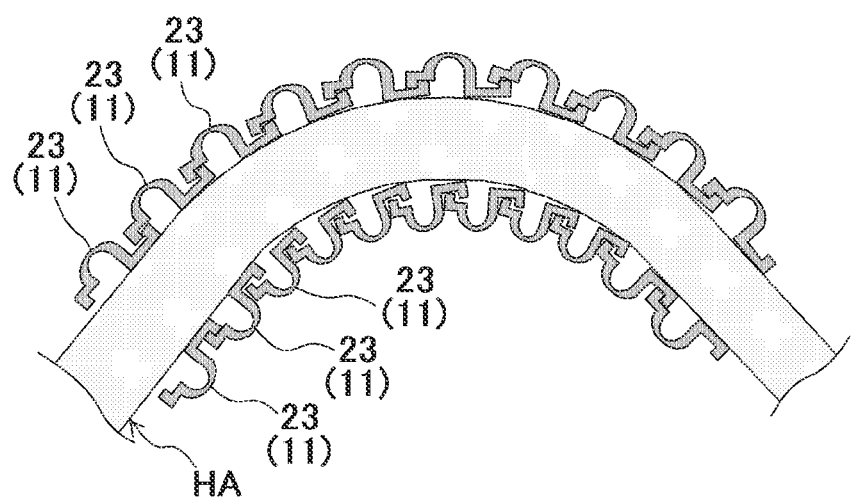
FIG. 9 is a cross-sectional view of the harness bundle in a second state where the spiral tube according to the third modification is mounted.

FIG. 9 shows, in correspondence with FIG. 7, a second state where the harness bundle HA is bent in a first state where the spiral tube 23 is mounted on the harness bundle HA as shown in FIG. 7. In FIG. 9, on the upper side of the harness bundle HA, the forces in the directions of separating the two adjacent tube materials 11 are applied, so that the state of FIG. 8B is obtained. The forces in the directions of bringing the two adjacent tube materials 11 close to each other are applied on the lower side of the harness bundle HA, so that the state of FIG. 8C is obtained. Therefore, the adjacent tube materials 11 partially overlap with each other in the horizontal direction on both of the sides, the form where the tube materials 11 are engaged with each other is maintained, the form of the spiral tube 23 is stably maintained, and thus the harness bundle HA is stably protected. Moreover, since each tube material 11 can be easily brought into the state shown in FIG. 9 by moving and deforming each tube material 11 in the horizontal direction as described above, the harness bundle HA can be easily deformed into such a state.

The tube material 11 constituting the spiral tube 23 having such a shape can be easily manufactured through using the extrusion molding machine 203 (opening portion 203A). By using the tube material 11 to perform the mounting process, the spiral tube 23 can be easily manufactured and can be easily mount on the harness bundle HA. On the other hand, according to the manufacturing method in the related art shown in FIGS. 10A to 10C, it is extremely difficult to manufacture the spiral tube 23 which has such a shape.

As for the cross-sectional shape, structures other than the above-described structures can be used as structures of the engaging portions engaging the tube materials which are adjacent to each other in the horizontal direction. At this time, the tube material including such an engaging portion can be easily manufactured to have a shape other than the above-described shape depending on the shape of the opening portion in the extrusion molding process.

The same also applies to the structure of the curved surface portion (deformation portion). Any shape can be used as long as the curved surface portion can be easily expanded and contracted in the horizontal direction and can be easily formed by extrusion molding. Alternatively, as long as the tube material itself is a material that is easily deformed, the curved surface portion (deformation portion) that is particularly easily deformed may not be provided in the structure. Although the spiral tube is mounted to the harness bundle HA that includes the plurality of wire harnesses in the above example, an object to be mounted may also be one single wire harness.

According to one or more embodiments, it is possible to provide a method for manufacturing a spiral tube that can be easily manufactured and mounted.

What is claimed is:

1. A method for manufacturing a spiral tube which is made of a resin material and spirally covers a periphery of a wire harness along an extending direction of the wire harness, the method comprising:
   extrusion molding a tube material which is made of the resin material;
   winding the tube material around a reel after extrusion molding the tube material;
   unwinding the tube material from the reel;
   heating and softening the tube material that is unwound from the reel, and forming the spiral tube; and
   spirally winding the spiral tube around the wire harness and cutting the spiral tube.

2. The method for manufacturing the spiral tube according to claim 1,
   wherein in the spirally wounding the spiral tube around the wire harness, the tube material is spirally wound around the wire harness in such a manner that a gap is formed between adjacent tube materials on a surface of the wire harness.

3. The method for manufacturing the spiral tube according to claim 1,
   wherein in the spirally wounding the spiral tube around the wire harness, the tube material is spirally wound around the wire harness in such a manner that adjacent tube materials partially overlap each other on the surface of the wire harness in a radial direction of the wire harness.

4. The method for manufacturing the spiral tube according to claim 2,
   wherein the spirally wounding the spiral tube around the wire harness includes:
      winding the tube material around the surface of the wire harness and forming a lower layer spiral tube; and
      winding the tube material around the wire harness and forming an upper layer spiral tube in such a manner that the gap is covered, after the forming the lower layer spiral tube.

5. The method for manufacturing the spiral tube according to claim 3,
   wherein the tube material includes a first engaging portion on a first side edge part and a second engaging portion on a second side edge part, along the longitudinal direction of the tube material, and
   wherein in the spirally wounding the spiral tube around the wire harness, the first engaging portion and the second engaging portion of the adjacent tube materials are configured to be engaged with each other on the surface of the wire harness so as to prevent an increase in a distance between the adjacent tube materials.

6. The method for manufacturing the spiral tube according to claim 5,
   wherein the tube material includes a curved surface portion having a curved surface shape between the first side edge part and the second side edge part.

* * * * *